United States Patent Office 3,183,181
Patented May 11, 1965

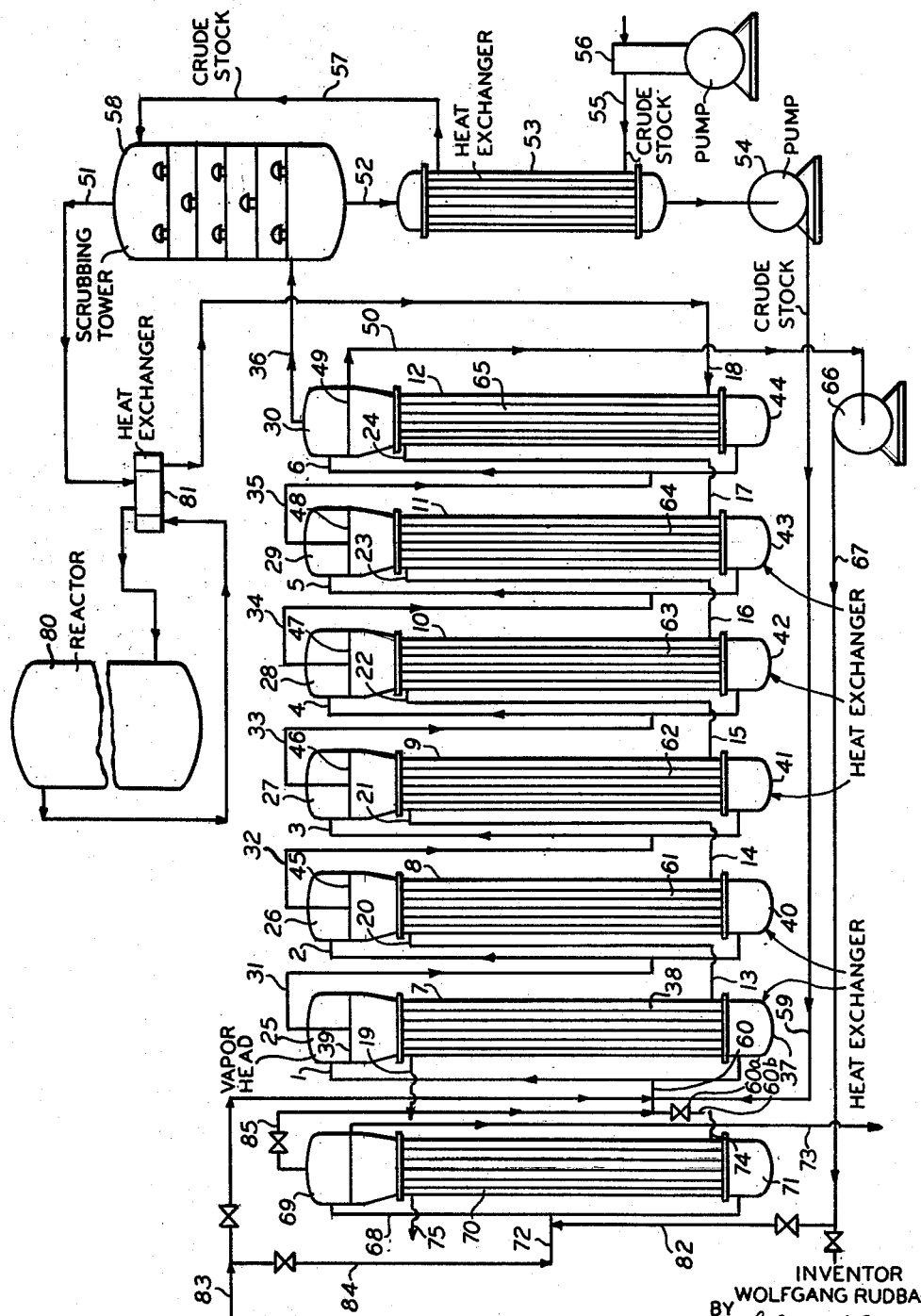

3,183,181
VAPORIZATION OF HYDROCARBONS
Wolfgang Rudbach, Griedel, near Butzbach, Hesse, Germany, assignor to Metallgesellschaft Aktiengesellschaft, Frankfurt am Main, Germany, a corporation of Germany
Filed Apr. 9, 1963, Ser. No. 271,659
Claims priority, application Germany, Nov. 23, 1957, M 35,974; Sept. 10, 1959, M 42,695
22 Claims. (Cl. 208—211)

This invention relates to the vaporization of hydrocarbons, such as petroleum, benzine, gas oils, and the like.

This application is a continuation-in-part of my copending application Serial No. 775,320, filed November 20, 1958, now abandoned and a continuation-in-part of application Serial No. 55,033, filed September 9, 1960, now abandoned.

For refining purposes, it is well known in the art to subject mixture of hydrocarbons of various kinds, such as petroleum, gasoline, gas oils, and the like, containing unsaturated gum-forming hydrocarbons as well as organic sulphur, nitrogen, and oxygen compounds, to the action of hydrogen in the presence of catalysts which are not deactivated by contact with sulphur compounds at elevated pressure and temperature. In this manner the unsaturated compounds are converted into saturated compounds and the organic sulphur, nitrogen, and oxygen compounds are hydrogenated so as to eliminate the sulphur, nitrogen, and oxygen as hydrogen sulphide, ammonia, and steam. The reaction is performed in the vapor phase at pressures usually between 50 and 80 atmospheres and at temperatures between about 300 and 450° C.

The substances which are formed during the process by hydrogenation of the olefinic compounds originally present, are usually undesirable impurities, and provision is made for their removal. The resulting product is a hydrocarbon mixture of very high purity.

One of the drawbacks of this process is that some clogging may occur, due to the fact that while the hydrocarbons are being preheated, vaporized, and then further heated to reaction temperature, and on the catalyst itself, the gum-forming or like substances, usually present in the hydrocarbon mixture, polymerize, coke, or decompose. To overcome the difficulties which arise from this and similar causes many devices have been suggested and used. For instance, it has been proposed to perform the vaporization of the hydrocarbons in such a way that a major proportion of the substances which give rise to the aforementioned trouble are, as far as possible, maintained in the vaporized form, so that they can be removed more easily from the hydrocarbon mixture. This result can be achieved for instance by introducing the heat required for vaporizing the hydrocarbons to be refined, in stages by repeatedly and successively heating the hydrogen or hydrogen-containing gas required for the refining process, and intimately mixing in stages the hot hydrogen or hydrogen-containing gas required for the refining process, and intimately mixing in stages the hot hydrogen or hydrogen-containing gas with the hydrocarbons. It has also been suggested, instead of heating the hydrogen or hydrogen-containnig gas, to heat the hydrocarbons themselves before admitting them to the action of the hydrogen or hydrogen-containing gas, in the vaporizer, in such manner that they are heated separately from the hydrogen or hydrogen-containing gas and not mixed therewith until they have entered the respective unit of the vaporizer. Upon leaving the vaporizer, the hydrocarbons are separated from the hydrogen and the hydrogen-containing gas.

Recourse has also been had to the device of heating separately both the hydrocarbon mixture to be refined and the hydrogen or hydrogen-containing gas, prior to mixing.

Another process consists of introducing liquid crude benzine, which has to be purified to form light-oil vapors, without any change from its liquid phase, into a heater and then into a mixing and conveying apparatus, which serves as an air-lift pump. In this apparatus, the hydrocarbons are intimately mixed with the hydrogen or hydrogen-containing gas, causing part of the hydrocarbons to vaporize.

From the mixing and conveying apparatus, the mixture of gases, vapors, and liquid substances is returned to the vaporizing vessel in which the gas and vapor are separated from the liquid phase.

According to this process, vaporization of the hydrocarbons is best performed in two or several similarly equipped units of the vaporizer arranged one above the other. For instance, in a double-effect vaporizer, the hydrogen gas is introduced into the sump where the residue from the material vaporized in the previous vaporizer unit has been collected. Upon passing through the liquid material, the gas picks up hydrocarbon vapors, and then it is introduced into an air-lift pump, which acts as a conveyor to transfer hydrocarbons from the second vaporizer unit to a heater. The air-lift pump returns the heated hydrocarbons to the second vaporizer unit where they are partially vaporized. The gas-vapor mixture from the second vaporizer unit acts as entraining means in a second vaporizer unit and a heater. In the first stage of vaporization, the gas-vapor mixture picks up further quantity of hydrocarbons which then enter the hydrogenation catalytic refining plant after going through a heater required for the reaction. The crude stock which it is intended to refine enters the first vaporizer column, and the second vaporization column is supplied with hydrocarbons.

In these known processes steam or hot water is required as a heating medium for the vaporization columns. The object of the process of this invention is to prevent the formation of deposits on the walls of the apparatus by suitably heating the hydrocarbons and allowing vaporization to occur in a very efficient and reproducible manner.

Another object of the process of this invention is to achieve vaporization of the hydrocarbon mixture by the use of a low temperature gradient between the heating medium and the liquid hydrocarbons to be vaporized. Another object of the invention consists of utilizing, as a heating medium, the gas vapor mixture, which emerges from the hydrogenation reactor.

A further object of the invention is to provide a procedure whereby the vaporization of the crude material can be performed more efficiently in that the recovery of values therefrom is increased.

Essentially, the process, according to this invention, for the catalytic hydrogenation refining of hydrocarbons, such as petroleum, gasoline, gas oil, and the like, consists of vaporizing the hydrocarbons, in the presence of hydrogen or hydrogen-containing gas in a double or multiple-zone vaporizer. The hydrocarbons pass in succession through the multiple-zone vaporizer in mixture with the hydrogen or hydrogen-containing gas, and in the course of their vaporization, they are maintained in circulation through each vaporizer zone by the action of the hydrogen or the hydrogen-containing gas as in an air-lift pump in such a manner that only the liquid phase flows through the heating system of the vaporizer. The vaporizers are heated by the gas-vapor mixture emerging from the catalytic hydrogenation reactor after this mixture has transferred some heat preferably to the gas-vapor mixture which is about to enter the refining reactor, in such manner that the gas-vapor mixture which serves as the heating medium flows in succession through the heating systems of the several vaporizer zones, entering the last and leaving the first zone. The hydrocarbons, as well as the hydrogen or the hydrogen-containing gas which assists vaporization, are conducted through the vaporization zones in counter-current direction to the heating medium.

Preferably a large number of vaporizer zones are arranged in series. Vaporization in each individual unit can be successfully accomplished with a low temperature gradient between the heating medium and the hydrocarbons which are to be vaporized, and vaporization is accomplished in an exceptionally satisfactory manner. Provision is made for the removal of the very fine solid impurities contained in the crude stock which cannot be removed by filtration; for instance, iron dust, rust, iron sulphide, and the like; according to this process, these impurities are removed before they have been able to form deposits on the wall of the apparatus.

One of the advantages of the present process resides in the fact that no additional provision is required for special heating medium for the hydrocarbons which are to be refined, and the heat contained in the refined product, i.e., both the contact heat as well as the heat of condensation of the condensable substances leaving the reactor, is utilized to the best advantage for the purposes of the process itself.

In many instances it may be advisable to convey the mixture of hydrocarbon vapors and hydrogen or hydrogen-containing gas emerging from the final vaporizer unit, preferably after the entrained mists, foams, or the like have been removed by means of a separator, into equipment in which it is treated with crude stock or refined product. This treatment may take place for instance in a column into which the gas-vapor mixture is introduced at the bottom. The crude stock or a small proportion of the refined product is introduced overhead, and both substances traverse the column in countercurrent direction with respect to each other. The object of this treatment is to remove the high-boiling constituents from the gas-vapor mixture. The crude stock or the refined product is employed for scrubbing the gas vapor mixture; the scrubbing is carried out at a temperature at which an exchange of the light hydrocarbons in the scrubbing medium with the heavy hydrocarbons in the gas-vapor mixture will occur. The purpose of the column is also to supplement the action of the separator and remove the mist from the scrubbed gas-vapor mixture which might otherwise adversely affect the operation in the subsequent heat exchangers and also deactivate the catalyst in the subsequent step. Moreover, the column serves the purpose of removing the foam material which is likely to be present in the gas-vapor mixture and which may in certain circumstances be formed in the final vaporizer and adversely affect the smooth operation of the process. After leaving this column the gas-vapor mixture is then preheated in conventional manner to the required reaction temperature and catalytically refined. If crude stock is used in the column for scrubbing the gas-vapor mixture, this stock may be returned to the first vaporizer zone, after having first been passed through a heat exchanger. In this heat exchanger heat is transferred from the stock leaving the column to the stock entering the column. An analogous procedure may be adopted when part of the refined product is used in the column; that is the refined product which does not vaporize in the column is likewise returned to the first vaporizer unit.

In a preferred embodiment of the invention, the accumulated vaporization residue which is withdrawn from the last vaporization stage is treated with the gas used for facilitating the vaporization, desirably hydrogen or a hydrogen-containing gas, and this gas is thereafter introduced into the first vaporization zone (that is the zone in which the crude stock being treated is first subjected to vaporization according to the invention) wherein the gas serves to promote the vaporization and circulation of the hydrocarbons through the vaporizer units.

By thusly treating the vaporization residue in accordance with the invention, with the gas, all valuable hydrocarbons are removed practically completely from the vaporization residue by the recycle gas. The undesirable higher boiling hydrocarbons contained in the refined product and which may in this connection be possibly taken up by the recycle gas are removed again upon the vaporization of the hydrocarbons to be treated.

The vaporization residue withdrawn from the last vaporizer on mixing with the fresh gas transfers its acquired heat to the recycle gas. In this way the heat content of the vaporization residue is utilized and the heat balance of the process is even still further improved. Furthermore, the final residue is now discharged cold and substantially free of all valuable low-boiling hydrocarbons. In the treatment of the vaporization residue with gas, which as indicated can be recycle gas, additional heat if required may also be supplied in known manner to the residue.

In order to enable the invention to be more readily understood, reference will now be made to the accompanying drawing which illustrates diagrammatically by way of example the operation of a multiple zone vaporizer.

The essential parts of the sextuple-column vaporizer shown in the drawing are uptakes 1, 2, 3, 4, 5 and 6 for each column, heaters 7, 8, 9, 10, 11 and 12 for each column, inlet pipes 13, 14, 15, 16, 17, and 18 to each heater, outlet pipes 19, 20, 21, 22, 23 and 24 for the heating medium issuing from each heater, vapor heads 25, 26, 27, 28, 29 and 30 for each column, and pipes 31, 32, 33, 34, 35 and 36 through which a mixture of vapor and liquid is conducted from the vapor head of each heater, to the uptake of the following heater or to a tower 58 (pipe 36). The outlet pipe for the heating medium from each heater, excepting that of the first heater 7, is connected to the inlet pipe for heating medium into the preceding heater. For instance, the outlet pipe 24 for the heating medium from the heater 12 is connected to the inlet pipe 17 for admitting the heating medium to the heater 11, so that the heating medium which enters at 18 successively serves all the heaters, beginning with the heater 12 and ending with the heater 7 from which it leaves through the outlet pipe 19.

The hydrocarbons which are to be refined, such as benzine, enter the uptake 1 from a pipe 59, the uptake 1 simultaneously receives, from a pipe 60, the gaseous medium which promotes the vaporization of the benzine and which entrains the benzine in the uptake 1, delivering it to the vapor head 25 of the heater 7. This causes a circulation of benzine from the foot 37 of the heater 7 through uptake 1 into the vapor head 25 and then down the heater tubes 38. The benzine is partly vaporized in the uptake 1 and in the vapor head 25. From the vapor head 25 which may be filled with liquid benzine for instance to the level indicated at 39, a mixture of liquid and vaporized benzine and gas is conveyed through the pipe 31 into the uptake 2 of the next heater 8. In this heater and the subsequent heaters 9, 10, 11 and 12 vaporization of the benzine continues. The subsequent heaters are constructed in the same manner as heater 1, i.e., they have heater tubes 61, 62, 63, 64 and 65 which connect the vapor heads with the feet 40, 41, 42, 43 and 44 of the heaters, and the vapor heads of these heaters are likewise partially filled with liquid as indicated by the levels marked 45, 46, 47, 48 and 49.

The heaters 8, 9, 10, 11 and 12 likewise incorporate benzine circulating systems in which circulation is maintained because in the uptakes 2, 3, 4, 5 and 6 benzine is continuously conveyed from the foot of each heater into its vapor head by the gases and vapors contained in the mixtures which enter through pipes 31, 32, 33, 34 and 35.

Vaporization occurs in the respective uptake pipes such as uptake pipes 2 and 3, and some vaporization occurs in the heat exchangers. With respect to each of the heat exchangers and its uptake pipe, advantageously, the vapor head for collection of the vapors from these two sources is provided as a single unit as is the case for the embodiment shown in the drawing. Thus, the vapor head for the collection of vapor evaporated in uptake pipe 1 and for collection of vapor evaporated in the heat exchanger 7 is the single unit provided as a vapor head 25 mounted atop the heat exchanger 7.

The multiple-zone vaporizer is operated in such manner that the major proportion of benzine is vaporized and the vaporized material which leaves the final heater 12 through a pipe 50 contains no more than about 6 to 12% by volume of the liquid benzine intake. This material may be processed in conventional manner, and any suitable fractions obtained therefrom may be returned for further processing in the vaporizer illustrated. Alternatively, the residue passing through pipe 50 can be contacted with gas as is hereinafter more fully described.

The benzine vapors from the vapor head 30 of the final heater 12, enter the tower 58 through the pipe 36, and are scrubbed in this tower, for instance with the crude hydrocarbons which have not yet been refined, or with a portion of a crude hydrocarbon stock for the purpose of removing any vapors, mists, or droplets of higher-boiling hydrocarbons which may have been entrained from the vapor head 30 of the heater 12. After the removal of undesirable higher-boiling substances, the benzine vapors flow through pipe 51 to heat exchangers which are not shown in the drawing where their temperature is raised to that required for the catalytic reaction to be performed in the adjoining reactor 80. The scrubbing medium leaves the column 58 through a pipe 52 and after passing through a heat exchanger 53 it is conveyed by a pump 54 through the pipe 59 into the uptake 1 of the first heater 7. In the heat exchanger 53, some heat transfer occurs from the hydrocarbons which are to be refined and which have acquired heat in the column 58 to the crude stock; the crude stock, after having been partially pre-heated, is forced through a pipe 55 by a pump 56 into the heat exchanger 53; it then passes through a pipe 57 into the column 58 which operates substantially as a scrubber.

The mixture of refined benzine vapors and hydrogen-containing gases leaving the scrubber 58 is first introduced into a heat exchanger 81 in which the benzine vapors, which have not been refined yet, can be mixed with the hydrogen-containing gas necessary for the refining reaction, and are brought to the reaction temperature. After passage through the reactor 80, the gases pass through heat exchanger 81, give up heat to the reactor feed, and then pass to the heater 12 through the pipe 18 for use as the vaporization heating medium. The mixture flows consecutively through the heating systems of all the heaters and is finally taken from the last heater 7 through the pipe 19 to a condenser (not shown) in which the uncondensed remainder of the refined benzine is liquefied and all the benzine is separated from the noncondensable hydrogen-containing gas. The gas can be returned to the process, possibly after purification, through the pipe 60b and thus remains in a closed cycle. To compensate for the volume of hydrogen consumed in the catalytic refining reaction, fresh hydrogen, or fresh hydrogen-containing gas such as coke-oven gas, may be mixed with the recycled gas. An alternative procedure consists of introducing the fresh gas into the process at some other convenient point, for instance when two reactors are used, between the two reactors, so that only recycled gas will enter the vaporizer units.

The gas-vapor mixture used as a heating medium in the heaters may enter the final heater 12 at a temperature of for instance about 220° C. and then pass through the several columns of the sextuple-column plant with a temperature gradient of roughly 20° C. between columns, leaving the first heater 7 at temperatures between about 90 and 110° C. before entering the condenser. The heaters 7, 8, 9, 10, 11 and 12 are preferably vertical tube heaters having tubes 38, 61, 62, 63, 64 and 65 of maximum possible length, say 6 to 10 meters, conveniently 8 to 9 meters long. High velocity of flow can thus be achieved.

In a preferred embodiment of the invention, the vaporization residue which is the effluent from the heater 12 withdrawn through pipe 50 is contacted with gas, preferably the gas used to facilitate the vaporization as described hereinbefore. Thus, the residue from pipe 50 is pumped by pump 66 through line 67 to line 82 and into line 72 where it is combined with hydrogen-containing gas supply line 83 via line 84. The mixture of hydrogen-containing gas and vaporization residue is introduced into uptake pipe 68 which delivers it to the vapor head 69 of the heater 70.

The heater 70 can be of a construction similar to the construction of the heaters 7–12. Further, this heater can be operated in the manner that the other heaters are operated and so that a continuous liquid phase exists in the liquid about the tubes of the heater 70. Vaporization residue is separated from the gas and from vapor evaporated from the residue by the gas in the vapor head 69. The resulting liquid passes downwardly through the heater 70 to the foot 71 of the heater and is then circulated back to the vapor head by the gas lift resulting from the introduction of gas into line 68. A portion of the liquid circulated in the heater 70 is withdrawn from the vapor head through line 73. This liquid can be subjected to treatment as described hereinbefore with reference to the liquid withdrawn from the heater 12 when the liquid withdrawn from the heater 12 is not contacted with gas as is here described. Further, this liquid withdrawn through line 73 can be passed through the heat exchanger 56 to heat the crude stock. The gas and vapor separated in the vapor head 69 passes through pipe 85 and on to pipe 60 which conveys it to the uptake 1 of the vaporization train. A heating medium for the heater 70 can be introduced into the heater 70 via line 74, and the medium can be withdrawn from the heater via line 75. As is indicated in the drawing, the various lines are provided with suitable valves so that the process can be operated according to the preferred embodiment here described, or, if desired, without the contacting of the gas with the vaporization residue withdrawn from heater 12.

In this preferred embodiment involving contacting of the gas with the vaporization residue, the gas serves to remove the lower-boiling hydrocarbons from the residue, so that substantially all of the valuable hydrocarbons are removed from the residue. Further, during passage of the gas and vapor through the vaporization train including the heaters 7–12, the high-boiling materials as have been picked up by the gas during the contacting, are liquified and are withdrawn as part of the vaporization residue which passes through pipe 50. Thus, such high-boiling materials eventually leave the system through the pipe 73 which withdraws liquid from the heater 70.

The advantages of the process of the invention can be readily appreciated, because the high velocity of flow through the heater and the fact that the heating medium and the benzine are flowing through the heaters in counter-current direction, allow the heating elements of the heaters to remain very hot, so that no troublesome deposits can be formed and a satisfactory transfer of heat will always occur. Neither will undesirable deposits form in the other heater chambers nor in the vapor heads.

Since the present process utilizes the heat which is available from the refined benzine vapors for the purpose of vaporizing the crude benzine, on the one hand, a substantial saving of heat results and on the other hand, the vaporization of the crude benzine is achieved in a highly satisfactory and reproducible manner. It can readily be seen that this result is due to the fact that neither the heaters, the vaporizers, or the heat exchangers, for heating the benzine vapor to the proper reaction temperature, nor the catalyst in the reactor are clogged up with troublesome deposits which have always been a source of major difficulty in known processes as hitherto performed.

While the foregoing specification and drawing have been set forth for the purposes of illustrating the invention, it will be readily understood by those skilled in the art that various modifications and changes may be made without departing from the spirit and scope of the invention which is to be limited only by the scope of the appended claims.

What is claimed is:

1. In the process for the vaporization of hydrocarbons in the presence of a gas, the improvement which comprises establishing a plurality of series connected vaporization zones including a first and a last zone, each including a vertically extending indirect heat exchanger, introducing liquid hydrocarbons into the first of said zones, circulating liquid hydrocarbon to be vaporized as a continuous liquid phase downwardly through the indirect heat exchanger in each zone, removing heated liquid hydrocarbon from the bottom of each heat exchanger in each zone and transporting the same back to the upper portion of the same heat exchanger along a separate flow path by introducing a gas into said separate flow path to cause upward flow therein, separating gas and liquid phase in each zone, passing liquid hydrocarbon to the next series connected zone, passing separated gas to the separate flow paths of the next series connected zone, and removing the separated gas phase from the last zone.

2. Improvement according to claim 1 in which a hydrogen containing gas is introduced into the separate flow path of said first zone to cause upward flow therein and in which the gas introduced into the separate flow path of each subsequent zone to cause upward flow therein solely consists of gas passed from the preceding zone.

3. Improvement according to claim 1 in which the separated gas phase from the last zone is passed to a catalytic hydrogenation reaction and in which the hot fluid emerging from said catalytic hydrogenation reaction is utilized as the heating media in said heat exchangers, being passed in series therethrough from the last to the first.

4. Improvement according to claim 1, wherein said separate flow path of each heat exchanger is outside its heat exchanger, and the liquid hydrocarbon and gas passed to the next series connected zone are conveyed together to the separate flow path of the next series connected zone.

5. Improvement according to claim 1, wherein the liquid hydrocarbon withdrawn from the last zone is not more than about 6–12% by volume of the liquid hydrocarbon feed to the process.

6. Improvement according to claim 1, wherein liquid hydrocarbon withdrawn from the last zone as effluent of said vaporization zones is contacted with said gas prior to said introduction of the gas into the said separate flow path for the taking up by the gas of values contained in said effluent, thereafter separating said gas from said effluent and introducing the gas into said separate flow path as aforesaid.

7. Improvement according to claim 6, wherein said gas is a hydrogen containing gas.

8. Improvement according to claim 6, wherein said effluent from the last zone is about 6–12% of the starting crude liquid hydrocarbon stock.

9. Improvement according to claim 6, in which the separated gas phase from the last zone is passed to a catalytic hydrogenation reaction and in which the hot fluid emerging from said catalytic hydrogenation reaction is utilized as the heating media in said heat exchangers, being passed in series therethrough from the last to the first.

10. Improvement according to claim 6, wherein the recovered mixture of vaporized hydrocarbons and hydrogen is treated for separation therefrom of attendant impurities.

11. Improvement according to claim 10, wherein the recovered mixture of the vaporized hydrocarbon and hydrogen is subjected to a scrubbing treatment for removal therefrom of attendant impurities.

12. Improvement according to claim 11, wherein said scrubbing is effected with, as scrubbing agent, a portion of the crude unrefined hydrocarbons.

13. Improvement according to claim 9, wherein said hot fluid is maintained at a temperature of from 90–220° C.

14. In the process for the vaporization of liquid in which the liquid is passed in the presence of a gas to the vapor head of an indirect heat exchanger serving as the inlet for the liquid, and a heating medium is introduced into the heat exchanger for indirect heat exchange with the liquid, the improvement which comprises separating the liquid from the gas prior to passage through the heat exchanger, circulating the liquid as a continuous liquid phase through the heat exchanger, removing the heated liquid from the heat exchanger and circulating the same back to the vapor head of the heat exchanger along a separate flow path with the introduction of the gas into said separate flow path, removing liquid from the heat exchanger, and removing vapor and gas from the vapor head of the heat exchanger.

15. In the vaporization of hydrocarbons from a crude liquid hydrocarbon stock wherein a gas is added to the stock and the stock-gas mixture is passed in series through a plurality of heating zones including a first zone and a last zone and the gas and stock are heated to successively higher temperatures during the passage in series through said heating zones, whereby content of said stock is vaporized to provide a gas-vapor mixture suitable for hydrogenation treatment for the upgrading thereof, and said gas-vapor mixture is separated from the liquid residue effluent of the last zone, the improvement which comprises the step of contacting said liquid residue effluent from the last stage with said gas prior to addition of the gas to the stock for the taking up by the gas of values contained in the said effluent, thereafter separating the gas and said effluent and adding the gas to said stock as aforesaid.

16. The process of claim 15, wherein said gas is a hydrogen containing gas.

17. The process of claim 16, wherein said liquid residue effluent from the last zone is about 6–12% of the starting crude liquid hydrocarbon stock.

18. An apparatus for vaporizing liquid which comprises a plurality, including a first and a last, of vertically extending indirect heat exchangers, each having a vapor separation space at the upper portion thereof and a vertically extending separate flow conduit connecting the lower portion thereof to its vapor separation space inlet means for introducing liquid into the first indirect heat exchanger, means for passing fluid including gas from the vapor separation space of each said heat exchanger to the separate flow conduit of the next subsequent heat exchanger for upward flow therein, means for removing vapor from the vapor separation space of the last heat exchanger, and means for passing a heating fluid in series through said heat exchangers from said last to said first.

19. Apparatus according to claim 18, including means for introducing gas into the separate flow conduit of said first heat exchanger for upward flow therein.

20. An apparatus for the vaporization of hydrocarbons wherein a normally liquid hydrocarbon is vaporized in a vaporization stage and subsequently passed together with free hydrogen under hydrogenation conditions into contact with a hydrogenation catalyst in a hydrogenation stage which apparatus comprises a closed circuitous system including at least two interconnected successive vaporizers having separate liquid and gas inlets and outlets therein, conduits connecting the said inlets and outlets of successive vaporizers, at least two separate heat exchange means having inlets and outlets therein, each heat exchange means being adapted for indirect heat exchange with each of said vaporizers, conduits connecting the inlets and outlets of successive heat exchange means of said first and second vaporizers, means for passing heat exchange fluid from said last to said first heat exchange means, an accumulator for vapor for each of said vaporizers at the head thereof, an accumulator for liquid phase hydrocarbon for each of said vaporizers at the foot thereof, means for withdrawing accumulated vapor from the last of said vaporizers, means for passing accumulated vaporization residue from the last of said vaporizers to a separate column, means for introducing a hydrogen containing gaseous scrubbing agent in said column for contacting with said residue and means for passing the gas-vapor mixture thereby formed from said separate column into the gas inlet of the first of said vaporizers.

21. Improvement according to claim 1, the temperature of the heating medium employed in said heat exchanges being in the range of about 90–220° C.

22. Improvement according to claim 3, wherein the temperature of said hot fluid is about 90–220° C.

References Cited by the Examiner
UNITED STATES PATENTS

| | | | |
|---|---|---|---|
| Re. 21,450 | 5/40 | Pyzel | 260—683.9 |
| 1,453,479 | 5/23 | Persch | 208—362 |
| 1,924,602 | 8/33 | Gard | 208—356 |
| 1,994,727 | 3/35 | Pavlars | 208—362 |
| 2,073,578 | 3/37 | Gwynn | 208—210 |
| 2,138,881 | 12/38 | Pyzel | 260—683.9 |
| 2,139,351 | 12/38 | Bejarano | 260—683.9 |
| 2,147,268 | 2/39 | Pyzel | 260—683.9 |
| 2,210,901 | 8/40 | Crittenden | 196—134 |
| 2,273,399 | 2/42 | Szayna | 208—210 |
| 2,276,089 | 3/42 | Ragatz | 196—134 |
| 2,606,141 | 8/52 | Meyers | 208—214 |
| 2,739,880 | 3/56 | Dickinson | 208—89 |
| 2,844,517 | 7/58 | Inwood | 208—210 |
| 2,937,134 | 5/60 | Bowles | 208—210 |
| 2,943,047 | 6/60 | Reeg et al. | 208—254 |

ALPHONSO D. SULLIVAN, *Primary Examiner.*